United States Patent [19]
Place

[11] 3,913,053
[45] Oct. 14, 1975

[54] THERMOSTAT WITH POSITIVE-OFF MECHANISM

[75] Inventor: Donald E. Place, Mansfield, Ohio

[73] Assignee: Therm-O-Disc, Incorporated, Mansfield, Ohio

[22] Filed: Oct. 15, 1973

[21] Appl. No.: 406,538

[52] U.S. Cl. .................. 337/347; 337/354; 337/361
[51] Int. Cl.² ......................................... H01H 37/12
[58] Field of Search ............. 337/56, 118, 347, 348, 337/354, 358, 360, 361, 367

[56] References Cited
UNITED STATES PATENTS

| | | | |
|---|---|---|---|
| 3,500,278 | 3/1970 | Them | 337/367 |
| 3,676,817 | 7/1972 | Bletz | 337/347 |

*Primary Examiner*—L. T. Hix
*Assistant Examiner*—Fred E. Bell
*Attorney, Agent, or Firm*—McNenny, Farrington, Pearne & Gordon

[57] ABSTRACT

A bimetal snap disc thermostat is disclosed in which means are provided to adjust the operating temperature of the thermostat by the rotation of a control member. A positive-off slide is positioned between the disc and the switch operated thereby and is operated by the control member between an operated position and an inactive position. In the operated position, the slide engages the bumper mechanism and maintains the switch in the open condition. In one embodiment, a single bumper is used for the normal operation of the switch by the bimetal snap disc and for operation by the positive-off slide. In the second embodiment, an auxiliary bumper is used through which the positive-off slide functions to maintain the switch in an open condition.

11 Claims, 6 Drawing Figures

1

THERMOSTAT WITH POSITIVE-OFF MECHANISM

BACKGROUND OF THE INVENTION

This invention relates generally to thermostats and more particularly to a thermostat provided with a novel and improved positive-off mechanism.

PRIOR ART

In certain instances, it is desirable to provide means to positively shut off a thermostat so that it cannot operate in its normal automatic mode of operation. For example, the U.S. Pat. No. 3,462,722 discloses an adjustable bimetal blade type thermostat of the type commonly used in air conditioning systems. In this thermostat, means are provided in the adjusting system to produce a sufficient bias in the bimetal blade to maintain the switch in an open condition under all temperature conditions expected to be encountered. Another example of such a device is illustrated in the U.S. Pat. No. 3,201,548 wherein the thermostat is provided with a position sensitive control to prevent closure of the thermostatic switch if the device in which the switch is installed tips over or the like causing a potentially dangerous situation if continued operation is permitted.

SUMMARY OF THE INVENTION

The present invention is directed to a thermostat incorporating a novel and improved positive-off mechanism which is operable to positively prevent thermostat operation in its normal automatic mode. In the illustrated embodiments, the positive-off is applied to an adjustable bimetal snap disc thermostat of the type illustrated and claimed in the U.S. Pat. to Bletz, Nos. 3,676,817 and 3,735,319 (both assigned to the assignee of the present invention). In such a thermostat, means are provided to adjust the thermostat operating temperature by means of a load spring which operates to apply an adjustable load to a bimetal snap disc and in turn provide adjustment of the operating temperature of the thermostat.

In accordance with the present invention, a separate positive-off structure is provided to positively block the thermostat in the open condition and to render the bimetal snap disc incapable of operating the thermostat. In this invention, the positive-off functions to maintain the thermostat switch open regardless of the temperature encountered by the thermostat.

In one illustrated embodiment of this invention, a shuttle or slide engages the main bumper of the thermostat and blocks the bumper in a position in which it in turn holds the thermostatic switch open. In a second embodiment, the slide functions to engage an auxiliary bumper and operates therethrough to maintain the switch in the open condition. Because the positive-off mechanism in accordance with the present invention acts directly on the switch mechanism, it is not necessary to apply large forces to the adjusting spring to maintain the switch in the open condition.

DETAILED DESCRIPTION OF THE DRAWINGS

Figure 1:
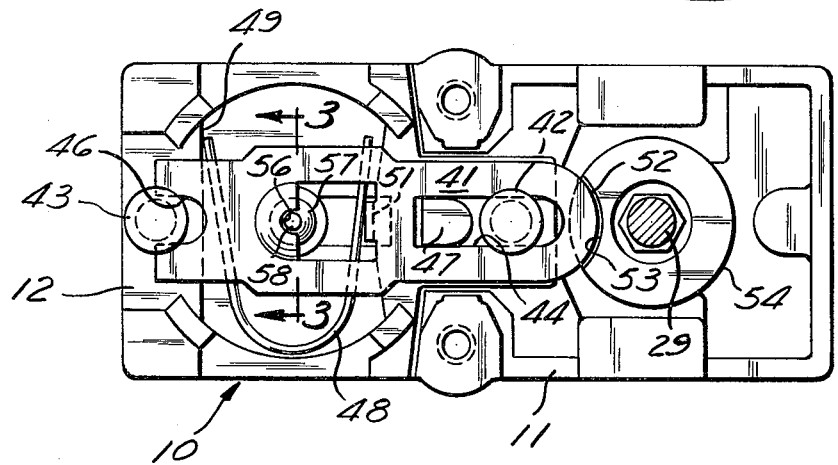
FIG. 1 is a plan view, with parts removed for purposes of illustration, of a thermostat incorporating a first preferred embodiment of this invention.

In both the illustrated embodiments of the present invention, the positive-off mechanism is installed on similar basic thermostats. Therefore, the initial description applies to both embodiments. Each thermostat includes a body assembly 10 consisting of a main body member 11 and a cover body member 12. The two body members cooperate to provide a switch chamber 13 in which is mounted a switch including a fixed contact 14 and a mobile or movable contact 16. The fixed or stationary contact 14 is mounted on a substantially rigid contact support arm 17, and the movable contact is mounted on the end of a resilient cantilever support arm 18. The support arm is shaped and mounted to normally maintain the contacts closed. In some instances, a double-throw switch may be provided. In such instances, a second fixed contact is provided on the opposite side of the mobile contact.

A bimetal snap disc 19 is supported at its periphery on the body assembly 10 and provides a central portion which moves back and forth with snap action in response to temperature changes. Aligned with the central portion of the disc is a main bumper 21 which is engaged at its upper end by the central portion of the disc and at its lower end by the mobile contact arm. The bumper 21 functions to open and close the switch in response to the snap movement of the disc 19.

An adjustable load spring 22 is provided to permit the adjustment of the operating temperature of the disc. The load spring is preferably formed of bimetal, and is supported at approximately the middle thereof by a fulcrum wire 23. One end 24 of the load spring overlies the disc 19 and is provided with a button projection 26 which engages the side of the disc opposite the bumper 21. The opposite end is formed with a dimple or projection 27 which engages a barrel cam 28. Rotation of the barrel cam by means of an adjusting drive knob 29 raises and lowers the dimpled end 27 of the load spring and thereby changes the force of the load spring which is applied to the disc. This adjustably changes the operating temperature of the disc. Reference may be made to the Bletz patent, supra, for a more detailed description of the structure and mode of operation of the basic thermostat.

In both embodiments of this invention, a mechanism is provided to positively hold the thermostat switch open when the positive-off mechanism is operated. Turning first to the embodiment of FIGS. 1 through 3, a slide 41 is positioned along the upper side of the body member 12. The drive fasteners 42 and 43 provide the dual function of securing the two body members together and also securing the slide 41 in position. The slide is notched at 44 and 46 to receive the associated drive fasteners. Also, a projection 47 formed on the body member 12 extends up through the notch opening 44 to provide additional guiding functions.

Figure 2:
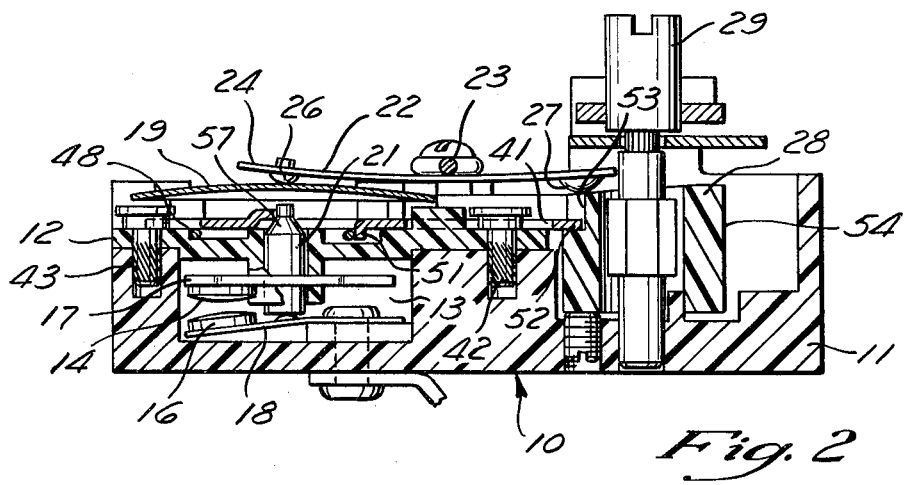
FIG. 2 is a side elevation in cross section illustrating the overall structure of the thermostat of FIG. 1 and the positive-off mechanism.
Figure 3:
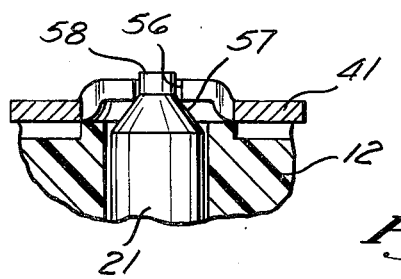
FIG. 3 is an enlarged fragmentary section taken generally along 3—3 of FIG. 1.

A U-shaped spring 48 extends between a wall 49 on the body member 12 and a projection 51 on the slide to bias the slide to the right as viewed in FIGS. 1 and 2. This maintains the end 52 of the slide in contact with the barrel cam 28. The barrel cam 28 is formed with a circular shaped recess 53 which allows the slide to move to the right to the illustrated position when the recess is positioned in alignment with the circular end of the slide. When the barrel cam 28 is rotated from the illustrated position, the slide is cammed to the left, and the end 52 engages the periphery 54 of the barrel cam. This structure, in effect, provides a detent which gives a physical indication that the barrel cam has been rotated to the positive-off position. Also, the effect of the spring in combination with the curved end of the slide and its mating engagement with the recess 53 insures that the parts move to the full seated position illustrated.

The slide 41 is also provided with a camming section having an axially extending notch 56 which engages a conical section 57 on the bumper 21 to cam the bumper downwardly to the illustrated position when the slide moves to the right into the recess 53. The various elements are proportioned so that when the slide moves to this position, it cams the bumper 21 downwardly to the illustrated position in which the two contacts are positively maintained in an open condition. A small projection 58 extends up through the notch 56.

When the barrel cam 28 is rotated in either direction from the illustrated position, the slide is cammed to the left so that the slide is clear of the upper portion of the bumper 21. In such a condition, the bumper operates under the influence of the disc 19 to open the switch when the disc snaps through from the illustrated position, or to allow the switch to close when the disc is in the position illustrated. The bumper is sized so that a slight clearance is present at one or the other ends of the bumper when the disc is in the illustrated position and the switch is closed. The clearance is sized so that the disc is in full snap movement when the switch is either opened or closed.

Figure 4:
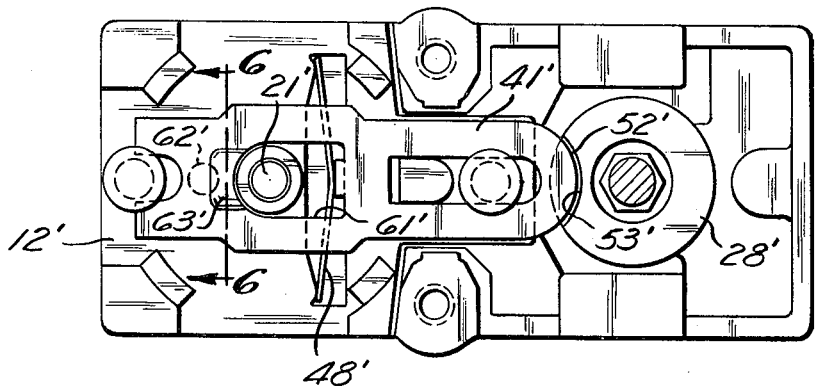
FIG. 4 is a plan view of a thermostat similar to the thermostat illustrated in FIGS. 1 through 3, with parts removed for purposes of illustration, wherein a second embodiment of a positive-off in accordance with the present invention is illustrated.
Figure 5:
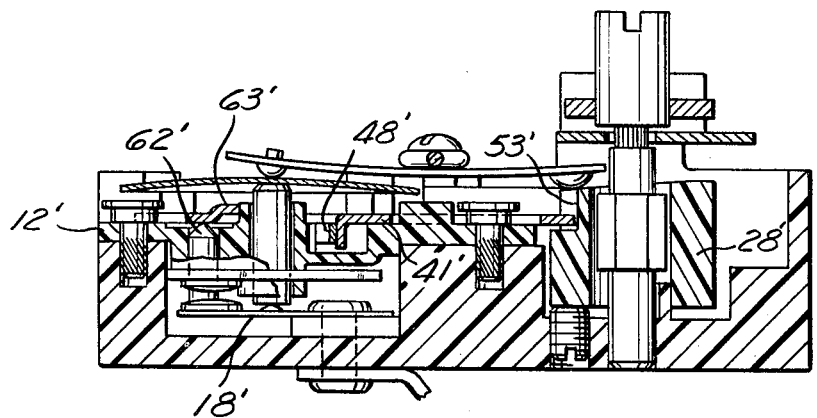
FIG. 5 is a side elevation in cross section of the thermostat illustrated in FIG. 4 showing a general arrangement of the thermostat.
Figure 6:
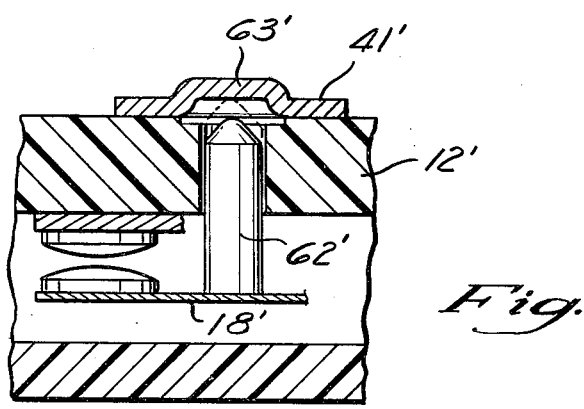
FIG. 6 is an enlarged fragmentary section taken generally along 6—6 of FIG. 4.

In the embodiments of FIGS. 4 through 6, a similar slide is utilized. In this embodiment, similar reference numerals are used to designate similar parts, but a prime is added to indicate that reference is being made to the second embodiment. Here again, a slide 41' is mounted for movement on the upper side of the body member 12, and a spring 48' biases the slide toward the right as viewed in the drawings. The barrel cam 28' is again provided with a recess 53' to receive the end 52' of the slide 41'. In this embodiment, however, the slide does not function through the main bumper 21', and is formed with a clearance opening 61' through which the main bumper 21' projects. A second or auxiliary bumper 62' is guided in the housing member 12' and is sized to engage the mobile contact arm 18' and hold the contacts open when it is depressed by the slide 41'. Preferably, the upper end of the auxiliary bumper 62' is rounded to facilitate the camming action.

When the barrel cam 28' is rotated from the illustrated position, the slide 41' is cammed to the left against the action of the spring, and a raised section 63' is positioned in alignment with the auxiliary bumper 62', and this allows the bumper to raise up and permit the switch to close.

In both embodiments, the slide operates to positively hold the switch open when it is in the operated position. In other positions when it is rendered inoperative, the switch opens and closes in an automatic manner in response to the snap movement of the disc 19. Since the slide functions independently of the snap disc and load spring, it is not necessary to produce a high stress in either of the operating elements. Consequently, a positive-off is achieved without encountering excessive stresses which could cause a permanent deformation in either the disc or the load spring. Further, the positive-off functions completely independent of temperature, and it is not possible with the present invention for the thermostat to encounter a temperature which would cause operation in a positive-off condition.

Although preferred embodiments of this invention are illustrated, it should be understood that various modifications and rearrangements of parts may be resorted to without departing from the scope of the invention disclosed and claimed herein.

What is claimed is:

1. A thermostat comprising a body, a switch on said body, a bimetallic snap disc connected to operate said switch, adjustment means including a control element movable to adjust the operating temperature of said disc, and a positive-off mechanism operable by movement of said control element to a predetermined position to render said disc incapable of operating said switch without restraining the movement of said disc.

2. A thermostat as set forth in claim 1 wherein said adjustment means includes a load spring operable to apply an adjustable force to said snap disc.

3. A thermostat as set forth in claim 1 wherein bumper means are provided to operate said switch in response to snap movement of said disc, and said positive-off mechanism operates through said bumper means to maintain said switch in one position.

4. A thermostat as set forth in claim 3 wherein said bumper means includes a single bumper, said single bumper being engagable by said disc to cause operation of said switch, said single bumper also being engagable by said positive-off mechanism to maintain said switch in said one position.

5. A thermostat as set forth in claim 3 wherein said bumper means includes first and second bumpers, said first bumper being engagable by said disc to cause operation of said switch, and said second bumper being engagable by said positive-off mechanism to maintain said switch in said one position.

6. A thermostat comprising a body, a switch on said body, a bimetal element on said body, bumper means on said body operable to open and close said switch in response to movement of said bimetal element, a positive-off element on said body movable to an operated position, said positive-off element when in said operated position coacting with said bumper means to prevent operation of said switch by said bimetal element, said bumper means including a single bumper engageable by said bimetal element to cause operation of said switch, said single bumper being engageable by said positive-off mechanism to prevent operation of said switch by said bimetal element.

7. A thermostat comprising a body, a switch on said body, a bimetal element on said body, bumper means on said body operable to open and close said switch in response to movement of said bimetal element, a positive-off element on said body movable to an operated position, said positive-off element when in said operated position coacting with said bumper means to prevent operation of said switch by said bimetal element, said bumper means including first and second bumpers, said first bumper being engageable by said bimetal element to cause operation of said switch, and said second bumper being engageable by said positive-off element to prevent operation of said switch by said bimetal element.

8. A thermostat as set forth in claim 6 wherein said bimetal element is a snap disc and said positive-off element is a slide interposed between said snap disc and said switch.

9. A thermostat comprising a body, a switch on said body, a bimetal element connected to operate said switch, adjusting means operable to apply an adjustable force to said bimetal element to adjust the operating temperature of said switch, said adjusting means including a control element for movement by a user to adjust said operating temperature, and a positive-off mechanism independent of said bimetal element operable by movement of said control element to a predetermined position to render said bimetal element incapable of operating said switch.

10. A thermostat as set forth in claim 9 wherein said positive-off mechanism includes a slide interposed between said bimetal element and said switch.

11. A thermostat as set forth in claim 10 wherein said bimetal element is a bimetal snap disc, and said adjusting means operates to apply an adjustable spring force to said bimetal snap disc to adjust the operating temperature thereof.

\* \* \* \* \*